US012706847B2

(12) United States Patent
Garg et al.

(10) Patent No.: US 12,706,847 B2
(45) Date of Patent: Aug. 11, 2026

(54) SOURCE LOAD BALANCING OF DATA PACKETS

(71) Applicant: Cisco Technology, Inc., San Jose, CA (US)

(72) Inventors: Rashmi Garg, Pleasanton, CA (US); Jon Langemak, Rockford, MN (US); Jerome Tollet, Paris (FR); Benoit Ganne, Malakoff (FR); Arthur de Kerhor, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 34 days.

(21) Appl. No.: 18/932,357

(22) Filed: Oct. 30, 2024

(65) Prior Publication Data

US 2026/0121984 A1 Apr. 30, 2026

(51) Int. Cl.
*H04L 47/125* (2022.01)
*H04L 45/02* (2022.01)
*H04L 47/122* (2022.01)

(52) U.S. Cl.
CPC ............ *H04L 47/125* (2013.01); *H04L 45/04* (2013.01); *H04L 47/122* (2013.01)

(58) Field of Classification Search
CPC ...... H04L 47/125; H04L 45/04; H04L 47/122
See application file for complete search history.

(56) References Cited

U.S. PATENT DOCUMENTS 11,671,367 B1 6/2023 Shukla
2004/0111529 A1* 6/2004 Parmar .................. H04L 67/63 709/245
2014/0330983 A1 11/2014 Zisapel et al.
2018/0351882 A1 12/2018 Jeganathan et al.
2018/0359177 A1 12/2018 Sorenson, III et al.
2020/0099656 A1 3/2020 Mittal et al.
2020/0169496 A1* 5/2020 Goliya .................... H04L 45/42
2024/0244002 A1 7/2024 Ge et al.
2025/0039150 A1* 1/2025 Bhagra ................. H04L 63/029
2025/0317395 A1* 10/2025 Kundur ................ H04L 47/125

OTHER PUBLICATIONS

European Search Report for European Application No. 24213731.3, dated Apr. 15, 2025, 8 Pages.

* cited by examiner

*Primary Examiner* — Christopher B Robinson
*Assistant Examiner* — Tania M Pena-Santana
(74) *Attorney, Agent, or Firm* — Polsinelli P.C.

(57) ABSTRACT

Disclosed is a method for load balancing at the source side rather than the destination side of a network. Destination networks can communicate with source load balancers by transmitting network protocol advertisements such as border gateway protocol (BGP) advertisements. The advertisements can communicate prefixes representing available subnets for load balancing purposes. The source load balancer would then load balance and transmit the network traffic along a path made up at least in part by the prefixes advertised by the network.

20 Claims, 5 Drawing Sheets

RECEIVING, AT A LOAD BALANCER AT A SOURCE, AN ADVERTISEMENT BY A NETWORK DEVICE AT A DESTINATION, THE ADVERTISEMENT INCLUDING A PREFIX REPRESENTING AN AVAILABLE SUBNET AT THE DESTINATION 402

DETERMINING, BY THE LOAD BALANCER AT THE SOURCE, A DISTRIBUTION OF NETWORK TRAFFIC FROM THE SOURCE 404

TRANSMITTING, BY THE LOAD BALANCER AT THE SOURCE, THE NETWORK TRAFFIC TO THE DESTINATION 406

FIG. 4

SOURCE LOAD BALANCING OF DATA PACKETS

TECHNICAL FIELD

The present disclosure relates to network communication, and in particular to load balancing data packets within a network.

BACKGROUND

Load balancing is a complex problem in networking. Load balancing involves distributing network traffic across multiple servers or resources to prevent a single server from becoming overwhelmed. This optimizes performance, improves response times, and increases reliability and availability of applications or services.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 illustrates a routine for load balancing network traffic at a source location in accordance with at least some embodiments of the present technology.

DETAILED DESCRIPTION OF EXEMPLARY EMBODIMENTS

Figure 1:
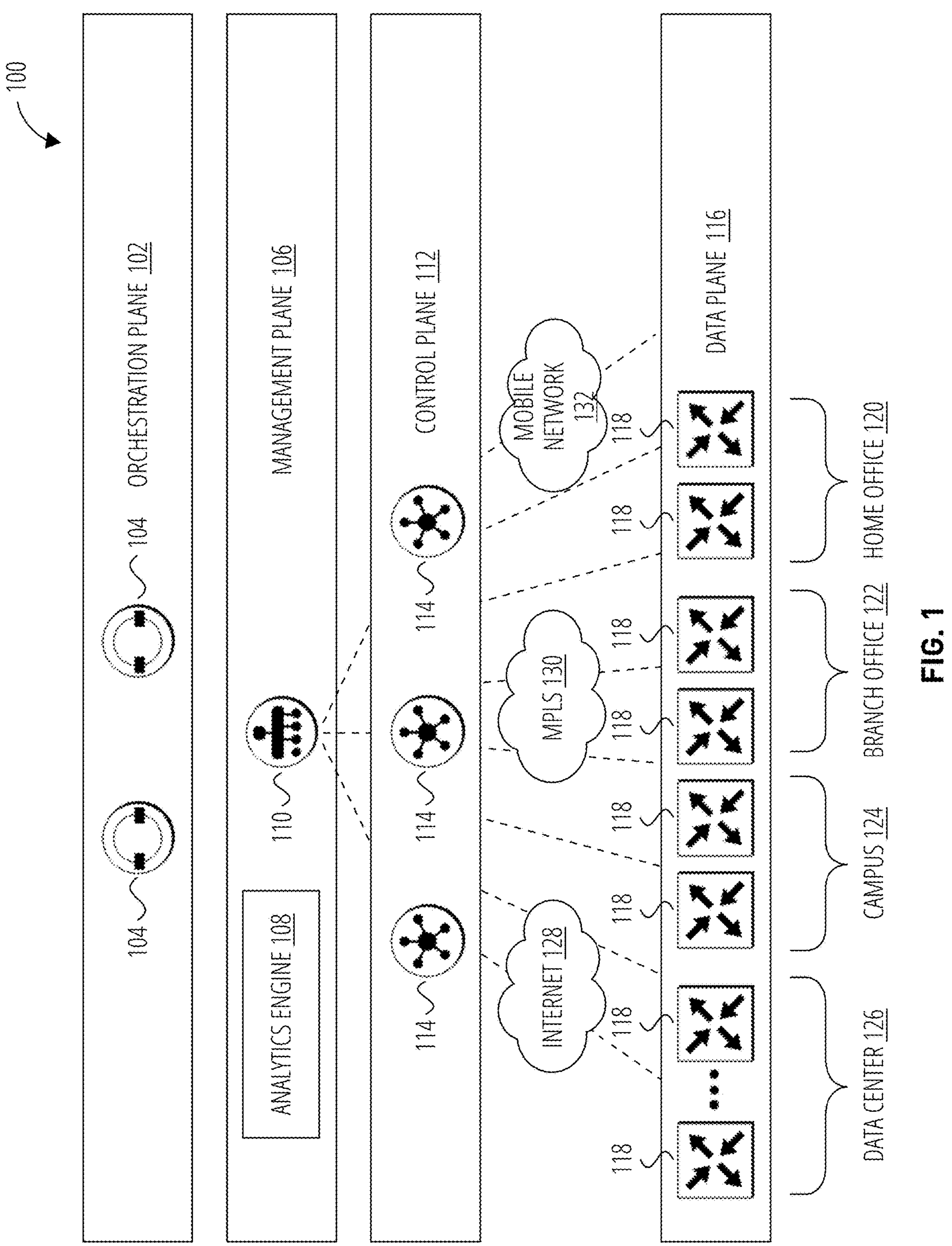
FIG. 1 illustrates an example of a high-level network architecture in accordance with at least some embodiments of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

A used herein the term "configured" shall be considered to interchangeably be used to refer to configured and configurable, unless the term "configurable" is explicitly used to distinguish from "configured". The proper understanding of the term will be apparent to persons of ordinary skill in the art in the context in which the term is used.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Many years ago, in a time when technology was still blossoming, making a phone call was an adventure in itself. It was a time when people would pick up their rotary phones and summon the familiar voice of the local telephone operator. This operator, often a friendly and familiar presence in small towns, would take down the desired number and connect the call by plugging and unplugging cords on a massive switchboard. The local operator ensured that voices from distant places could be brought together, weaving connections that spanned miles.

Current methods of load balancing are the opposite of the operator method from the past. Load balancing typically occurs at the destination side, and not at the source. Load balancing at a destination data center can cause delays in establishing initial handshakes, as the routing decisions add extra processing time. Additionally, moving packets up layers might experience latency due to the added complexity and potential bottlenecks in the load balancer's decision-making process.

The presently disclosed technology draws from the inspiration of historical phone operators to move network logic closer to the source, rather than burdening the destination with traffic distribution responsibilities. More particularly, the presently disclosed technology load balances at the source side rather than the destination side. Destination networks can communicate with source load balancers by transmitting network protocol advertisements such as border gateway protocol (BGP) advertisements. The advertisements can communicate prefixes representing available subnets for load balancing purposes. The source load balancer would then load balance and transmit the network traffic along a path made up at least in part by the prefixes advertised by the network.

The presently disclosed technology therefore avoids overburdening the destination side of the network with packet processing and load balancing operations. It also allows for flexibility on the destination side by allowing the destination side to move more virtual IP addresses to one node if that is preferred. In the event of a failure, the destination could also move virtual IP addresses to a working node rather than maintaining them on the failed node.

In some embodiments, the present technology includes a method, load balancer, or computer-readable medium having instructions for performing the following steps: receiving, at a load balancer at a source, an advertisement from a network device at a destination, the advertisement including a prefix representing an available subnet at the destination; determining, by the load balancer at the source, a distribution of network traffic from the source; and transmitting, by the load balancer at the source, the network traffic to the destination.

In some embodiments, the advertisement is a border gateway protocol (BGP) advertisement.

In some embodiments, the technology includes receiving, from the network device at the destination, an indication that IP addresses within the available subnet are capable of receiving the network traffic from the source.

In some embodiments, the technology includes receiving a second advertisement from the network device, the second advertisement advertising a different pool of IP addresses as the available subnet based on network analysis or user input at the network device at the destination.

In some embodiments, the technology includes determining, by the load balancer at the source, that the available subnet includes a destination IP address of the network traffic, wherein transmitting the network traffic includes transmitting the network traffic to the available subnet including the destination IP address.

In some embodiments, transmitting, by the load balancer at the source, the network traffic to the destination includes transmitting, to a gateway router of the available subnet, the network traffic; providing a destination IP address to the gateway router of the available subnet to permit the gateway router to determine whether the destination IP address is included within IP addresses of the available subnet; and providing, within the network traffic, an indication to transmit the network traffic to the destination IP address if the destination IP address is within the available subnet, or transmit the network traffic to a second subnet if the destination IP address is not within the available subnet.

In some embodiments, the destination is at least one of a data center, a server, a cloud computing environment, a virtual machine, a network storage device, a router, a switch, or a firewall.

EXAMPLE EMBODIMENTS

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 106, a control plane 112, and a data plane 116. The orchestration plane 102 can assist in the automatic on-boarding of edge network devices 118 (e.g., switches, routers, etc.) in an overlay network. The orchestration plane 102 can include one or more physical or virtual network orchestrator appliances 104. The network orchestrator appliances 104 can perform the initial authentication of the edge network devices 118 and orchestrate connectivity between devices of the control plane 112 and the data plane 116. In some embodiments, the network orchestrator appliances 104 can also enable communication of devices located behind Network Address Translation (NAT). In some embodiments, physical or virtual Cisco® SD-WAN vBond appliances can operate as the network orchestrator appliances 104.

The management plane 106 can be responsible for central configuration and monitoring of a network. The management plane 106 can include one or more physical or virtual network management appliances 110. In some embodiments, the network management appliances 110 can provide centralized management of the network via a graphical user interface to enable a user to monitor, configure, and maintain the edge network devices 118 and links (e.g., internet transport network 128, MPLS network 130, 4G/Mobile network 132) in an underlay and overlay network. The network management appliances 110 can support multi-tenancy and enable centralized management of logically isolated networks associated with different entities (e.g., enterprises, divisions within enterprises, groups within divisions, etc.). Alternatively or in addition, the network management appliances 110 can be a dedicated network management system for a single entity. In some embodiments, physical or virtual Cisco® SD-WAN vManage appliances can operate as the network management appliances 110. The management plane 106 can further include an analytics engine 108, as is known in the art.

The control plane 112 can build and maintain a network topology and make decisions on where traffic flows. The control plane 112 can include one or more physical or virtual network control appliances 114. The network control appliances 114 can establish secure connections to each edge network device 118 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network control appliances 114 can operate as route reflectors. The network control appliances 114 can also orchestrate secure connectivity in the data plane 116 between and among the edge network devices 118. For example, in some embodiments, the network control appliances 114 can distribute crypto key information among the edge network devices 118. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network control appliances 114.

The data plane 116 can be responsible for forwarding packets based on decisions from the control plane 112. The data plane 116 can include the edge network devices 118, which can be physical or virtual edge network devices. The edge network devices 118 can operate at the edges various network environments of an organization, such as in one or more data centers 126, campus networks 124, branch office networks 122, home office networks 120, and so forth, or in the cloud (e.g., Infrastructure as a Service (IaaS), Platform as a Service (PaaS), SaaS, and other cloud service provider networks). The edge network devices 118 can provide secure data plane connectivity among sites over one or more WAN transports, such as via one or more internet transport networks 128 (e.g., Digital Subscriber Line (DSL), cable, etc.), MPLS networks 130 (or other private packet-switched network (e.g., Metro Ethernet, Frame Relay, Asynchronous Transfer Mode (ATM), etc.), mobile networks 132 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 118 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 118.

A computer network is a geographically distributed collection of nodes interconnected by communication links and segments for transporting data between end nodes, such as personal computers and workstations, or other network devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Since management of interconnected computer networks can prove burdensome, smaller groups of computer networks may be maintained as routing domains or autonomous systems. An Autonomous System (AS) is a network or group of networks under common administration and with common routing policies. A typical example of an AS is a network administered and maintained by an Internet Service Provider (ISP). Customer networks, such as universities or corporations, connect to the ISP, and the ISP routes the network traffic originating from the customer networks to network destinations that may be in the same ISP or may be reachable only through other ISPs.

To facilitate the routing of network traffic through one or more ASes, the network elements of the ASes need to exchange routing information to various network destinations. Border Gateway Protocol (BGP) is an Exterior Gateway Protocol (EGP) that is used to exchange routing information among network elements (e.g., routers) in the same or different ASes. A computer host that executes a BGP process is typically referred to as a BGP host or a BGP network device. To exchange BGP routing information, two BGP hosts, or peers, first establish a transport protocol connection with one another. Initially, the BGP peers exchange messages to open a BGP session, and, after the BGP session is open, the BGP peers exchange their entire routing information. Thereafter, only updates or changes to the routing information are exchanged, or advertised, between the BGP peers. The exchanged routing information is maintained by the BGP peers during the existence of the BGP session.

The networks within an AS are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Figure 2:
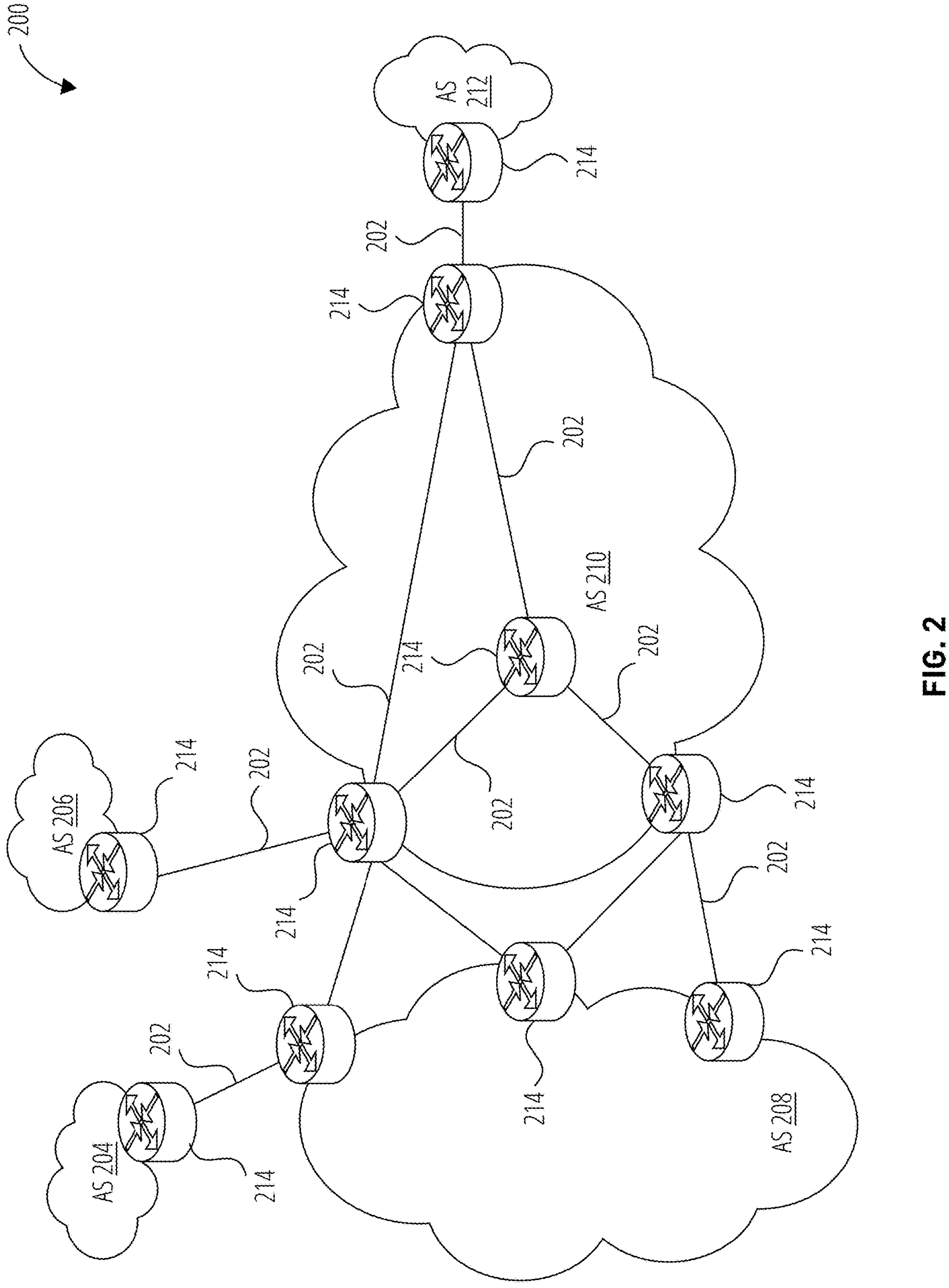
FIG. 2 illustrates an example communication network including one or more autonomous systems (ASes) in accordance with at least some embodiments of the present technology.

FIG. 2 is a schematic block diagram of an example computer network 200 illustratively comprising network devices 214 interconnected by various methods of communication. For instance, the communication paths 202 may be any suitable combination of wired links and shared media (e.g., wireless links, Internet Exchange Points, etc.) where certain network devices 214, such as, e.g., routers, computers, etc., may be in communication with other network devices 214, e.g., based on distance, signal strength, current operational status, location, etc. Those skilled in the art will understand that any number of network devices 214, links, etc. may be used in the computer network, and that the view shown herein is for simplicity.

Data packets (e.g., traffic and/or messages sent between the network devices 214) may be exchanged among the network devices 214 of the computer network 200 using predefined network communication protocols such as certain known wired protocols, as well as wireless protocols or other shared-media protocols where appropriate.

The computer network 200 includes a set of autonomous systems (AS) labeled as AS 204, AS 206, AS 208, AS 210 and AS 212. The computer network 200 may be positioned in any suitable network environment or communications architecture that operates to manage or otherwise direct information using any appropriate routing protocol or data management standard. For example, computer network 200 may be provided in conjunction with a border gateway protocol (BGP).

As noted above, an AS may be a collection of connected Internet Protocol (IP) routing network devices 214 under the control of one or more network operators that presents a common, clearly defined routing policy to a network (e.g., the Internet). Usually, an AS comprises network devices 214 that are established on the edge of the system, and that serve as the system's ingress and egress points for network traffic. Moreover, the network devices 214 may be considered edge network devices, border routers, or core network devices within the respective AS. These network devices typically, but not always, are routers or any other element of network infrastructure suitable for switching or forwarding data packets according to a routing protocol or switching protocol. For the purposes of the present disclosure, the network devices 214 located within an AS may alternatively be referred to as "forwarding network devices" or "intermediate network devices." Moreover, for illustration purposes, the AS 204, AS 206, AS 208, AS 210, and AS 212 are shown with a limited number of network devices 214. In an actual implementation, however, an AS normally comprises numerous routers, switches, and other elements.

Each AS 204, AS 206, AS 208, AS 210, and AS 212 may be associated with an Internet Service provider (ISP). Even though there may be multiple ASes supported by a single ISP, the Internet only sees the routing policy of the ISP. That ISP must have an officially registered Autonomous System Number (ASN). As such, a unique ASN is allocated to each AS for use in BGP routing. ASNs are important primarily because they uniquely identify each network on the Internet.

To facilitate the routing of network traffic through the ASes, or more specifically, the network devices 214 within the ASes, the network devices may exchange routing information to various network destinations. As described above, BGP is conventionally used to exchange routing and reachability information among network devices 214 within a single AS or between different ASes. One particular example of BGP is BGPv4, as defined in Request for Comments (RFC) 1771 of the Internet Engineering Task Force (IETF). Various embodiments may implement other versions of BGP, however, and the use of BGPv4 is not required. The BGP logic of a router is used by the data collectors to collect BGP AS path information, e.g., the "AS_PATH" attribute, as described further below, from BGP tables of border routers of an AS, to construct paths to prefixes.

To exchange BGP routing information, two BGP hosts (network devices 214), or peers, first establish a transport protocol connection with one another. Initially, the BGP peers exchange messages to open a BGP session, and, after the BGP session is open, the BGP peers exchange their entire routing information. Thereafter, in certain embodiments, only updates or changes to the routing information, e.g., the "BGP UPDATE" attribute, are exchanged, or advertised, between the BGP peers. The exchanged routing information is maintained by the BGP peers during the existence of the BGP session.

The BGP routing information may include the complete route to each network destination, e.g., "destination network device," that is reachable from a BGP host. A route, or path, comprises an address destination, which is usually represented by an address prefix (also referred to as prefix), and information that describe the path to the address destination. The address prefix may be expressed as a combination of a network address and a mask that indicates how many bits of the address are used to identify the network portion of the address. In Internet Protocol version 4 (IPv4) addressing, for example, the address prefix can be expressed as "9.2.0.2/16". The "/16" indicates that the first 16 bits are used to identify the unique network leaving the remaining bits in the address to identify the specific hosts within this network.

A path joining a plurality of ASes, e.g., communication paths 202, may be referred to as an "AS_PATH." The AS_PATH attribute indicates the list of ASes that must be traversed to reach the address destination. For example, as illustrated in FIG. 2, the AS 212 may store an AS_PATH attribute of "204 206 210 212" where the address destination is the AS 212 (or a particular IP address within AS 212). Here, the AS_PATH attribute indicates that the path to the address destination AS 212 from AS 208 passes through AS 204, AS 206 and AS 210, in that order.

Although it may be preferable that all network devices 214 in AS 204, AS 206, AS 208, AS 210, and AS 212 be configured according to BGP, in a real-world implementation, it may be unlikely that each network device communicates using BGP. Thus, the disclosed embodiments are applicable to scenarios where all network devices 214 in the computer network 200 are configured according to BGP, as well as scenarios where only a subset of the network devices 214 is configured as such. Moreover, between any of the ASes, there may be a single communication path 202, e.g., between AS 204 and AS 208, as shown in FIG. 2, or there may be multiple communication paths 202, e.g., between AS 208 and AS 210. Thus, the disclosed embodiments are applicable to either case, as described in further detail below.

Moreover, a security extension to the BGP has been developed, referred to as BGPSEC, which provides improved security for BGP routing. BGP does not include mechanisms that allow an AS to verify the legitimacy and authenticity of BGP route advertisements. The Resource Public Key Infrastructure (RPKI) provides a first step towards addressing the validation of BGP routing data. BGPSEC extends the RPKI by adding an additional type of certificate, referred to as a BGPSEC router certificate, that binds an AS number to a public signature verification key, the corresponding private key of which is held by one or more BGP speakers within this AS. Private keys corresponding to public keys in such certificates can then be used within BGPSEC to enable BGP speakers to sign on behalf of their AS. The certificates thus allow a relying party to verify that a BGPSEC signature was produced by a BGP speaker belonging to a given AS. Thus, a goal of BGPSEC is to use signatures to protect the AS Path attribute of BGP update messages so that a BGP speaker can assess the validity of the AS Path in update messages that it receives. It should be understood, however, that the embodiments for implementing AS Path security disclosed herein are not limited to BGPSEC; certain embodiments may, additionally or alternatively, be applicable to other suitable protocols, including, for example, SoBGP, S-BGP, and PGPBGP, to name just a few.

Figure 3:
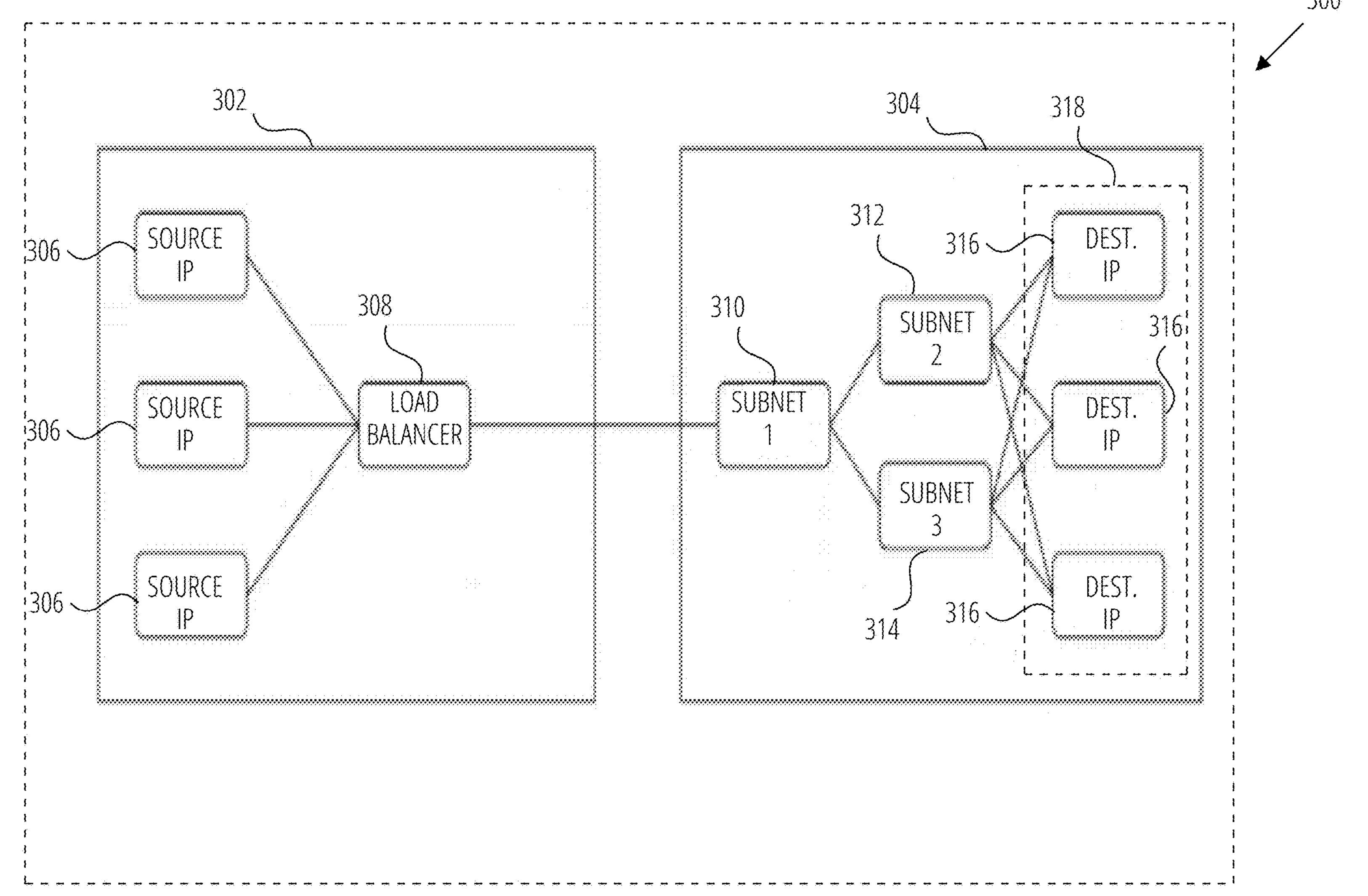
FIG. 3 illustrates a schematic diagram conceptually illustrating inter-data center transmission of data packets in accordance with at least some embodiments of the present technology.

FIG. 3 illustrates a schematic diagram conceptually illustrating inter-data center transmission of data packets in accordance with at least some embodiments of the present technology. As shown, a network 300 includes a source 302 and a destination 304. For example, the source 302 can be a client device, such as a computer, smartphone, or IoT device, capable of transmitting network traffic. Alternatively, the source 302 can be a collection of such devices, for example one or more devices having a source IP address, indicated in FIG. 3 as source IP address 306, and coupled to a load balancer 308 that determines a distribution of network traffic from the source 302. The destination 304 can be a device, devices, a subnet, a collection of subnets, or a geographic area. For example, as shown, the destination 304 can be at least one of a data center, a server, a cloud computing environment, a virtual machine, a network storage device, a router, a switch, or a firewall.

As shown, the destination 304 can include a plurality of subnets, including a first subnet 310, a second subnet 312, and a third subnet 314. The destination 304 can further include a plurality of end IP addresses referred to in the drawing as destination IP address 316. In this manner, the present technology can transmit data packets or other network traffic from the source 302, via the load balancer 308, to a destination IP address 316. The load balancer 308 can do so by transmitting the network traffic through the first subnet 310 as a "next hop subnet" instead of conventional routing sending the traffic through next hop IP addresses that are adjacent the router and with layer 2 connectivity. For example, and without limitation, the load balancer 308 can transmit the network traffic to an IP address including a netmask representing a subnet. The load balancer 308 can do so based on a network protocol advertisement (e.g., a BGP advertisement) advertising a prefix of IP addresses to which the load balancer may transmit network traffic. The first subnet 310 can then transmit the network traffic to the second subnet 312 or third subnet 314 depending on which is configured to receive network traffic based on a load balancing algorithm received at the load balancer 308. The second subnet 312 or third subnet 314 can then transmit the traffic to the destination subnet 318 and to the appropriate destination IP address.

The above process allows the source 302 to transmit network traffic from a load balancer 308 of the source 302 to a destination IP address 316 of a destination 304. In doing so, the destination 304 need not have a load balancer located within the destination network itself, but rather can benefit from the load balancer 308 of the source 302. The destination 304 can also enjoy flexibility by configuring which of the available subnets (e.g., the first subnet 310, the second subnet 312, the third subnet 314, or the destination subnet 318) are to receive network traffic from external load balancers. The destination 304 can do so by transmitting a BGP or other network protocol advertisement to the source 302 to identify the available subnets. Of course, the schematic illustration of FIG. 3 is exemplary only and network traffic may be transmitted from the source 302 directly to the first subnet 310, second subnet 312, third subnet 314, or destination subnet 318, as desired by a network controller associated with the destination 304.

FIG. 4 illustrates a routine for load balancing network traffic at a source location in accordance with at least some embodiments of the present technology. Although the example routine 400 depicts a particular sequence of operations, the sequence may be altered without departing from the scope of the present disclosure. For example, some of the operations depicted may be performed in parallel or in a different sequence that does not materially affect the function of the routine 400. In other examples, different components of an example device or system that implements the routine 400 may perform functions at substantially the same time or in a specific sequence.

According to some examples, the routine 400 includes receiving, at a load balancer at a source, an advertisement by a network device at a destination, the advertisement including a prefix representing an available subnet at the destination at block 402. For example, the load balancer 308 of FIG. 3 may receive an advertisement by a network device at a destination, the advertisement including a prefix representing an available subnet at the destination. A netmask may be included in the advertisement and utilized by the load balancer to calculate the number of possible hosts in the subnet and determine whether the subnet can accommodate the incoming traffic load.

The advertisement may include a prefix of available IP addresses for which the data traffic can be routed by the load balancer 308. As discussed, the advertisement can be a BGP advertisement. However, the present technology is not so limited and the advertisement can be any network protocol advertisement. For example, the advertisement can be an OSPF (Open Shortest Path First) advertisement, where routes are shared within an autonomous system to optimize the routing decisions. It could also be an EIGRP (Enhanced Interior Gateway Routing Protocol) advertisement, known for its efficiency and rapid convergence in larger network environments. Other possibilities include RIP (Routing Information Protocol) advertisements, which are simpler and often used in smaller networks, or IS-IS (Intermediate System to Intermediate System) advertisements used in complex networks, such as those operated by internet service providers.

According to some examples, the routine 400 includes determining, by the load balancer at the source, a distribution of network traffic from the source at block 404. For example, the load balancer 308 of FIG. 3 can determine a distribution of network traffic from the source. The load balancer 308 can therefore perform load balancing at the source 302 based on available prefixes advertised by the destination 304. For example, the destination 304 can include subnets defined with specific netmasks in their advertisements so as to effectively advertise a "next hop subnet" rather than a conventional next hop IP address. This approach allows for the inclusion of a broader network range in the routing information, which is particularly useful in large-scale or hierarchically structured networks. By specifying netmasks along with IP prefixes, such as '192.168.0.0/16' or '10.0.0.0/8', the destination can convey not just a single IP address, but an entire range of IP addresses that belong to a subnet. Those subnets (or networks that include the subnet) can then transmit the packets to the next subnet based on the load balancing algorithm implemented by the load balancer 308 at the source, but as dictated by the destination 304. The destination 304 can therefore benefit from flexible and user-customized load balancing despite not having a load balancer physically present at the destination 304.

According to some examples, the routine 400 includes transmitting, by the load balancer at the source, the network traffic to the destination at block 406. For example, the load balancer 308 of FIG. 3 can transmit the network traffic to the destination. This transmission can be based on a load balancing algorithm determined by the destination 304, for example as advertised by a BGP advertisement of a router within a subnet of the destination. In an embodiment, the advertisement could advertise a group of network devices (e.g., routers). These nodes would generate routing information that includes metadata about the routes they can handle. This metadata can include traffic handling capabilities, route preferences, or other relevant information that helps in making routing decisions. The multiple route advertisements would then be coalesced into a single, unified route advertisement sent to the source. This is beneficial because it simplifies the routing tables and reduces the overhead on routers to process multiple advertisements. By aggregating routes, the network can improve efficiency and decrease the amount of routing information that must be exchanged between routers. The next hop IP address could encode not a single IP address, but the beginning of another network. Specifically, it would encode a netmask in the IP address to define a subnet.

The present technology is therefore different than conventional BGP routing, which routes packets to a next hop address. Here, the technology routes packets to a next route prefix encoded as a special community. The technology therefore supports a wide variety of load balancing methods such as equal cost multi-path (ECMP) load balancing or weighted load balancing as configured at the destination subnet. Administrators at the destination subnet can allocate more IP addresses on the same edge node to provide a higher weight on that node as compared to a node serving a single IP address.

In some embodiments, the routine 400 can include determining, by the load balancer at the source, that the subnet includes a destination IP address of the network traffic. For example, the load balancer 308 of FIG. 3 can determine that the subnet includes the destination IP address of the network traffic. The load balancer can do so by analyzing the advertisement from the source and the available destination IP addresses of the subnet. Following this, the load balancer can transmit the network traffic to the destination. For example, the transmitting the network traffic can include transmitting the network traffic to the subnet including the destination IP address. In this manner, the load balancer can understand which subnet of the destination includes the destination IP address, and efficiently transmit the network traffic to that subnet as part or all of the load balancing algorithm, thereby improving efficiency.

In some embodiments, the routine 400 can include transmitting, to a gateway router of the subnet, the network traffic; providing a destination IP address to the gateway router of the subnet to permit the gateway router to determine whether the network traffic includes a destination IP address included within the IP addresses of the subnet; and providing, within the network traffic, an indication to transmit the network traffic to the destination IP address if the destination IP address is within the subnet, or transmit the network traffic to a second subnet if the destination IP address is not within the subnet. For example, the load balancer 308 can transmit, to a gateway router of the subnet, the network traffic; provide a destination IP address to the gateway router of the subnet to permit the gateway router to determine whether the network traffic includes a destination IP address included within the IP addresses of the subnet; and provide, within the network traffic, an indication to transmit the network traffic to the destination IP address if the destination IP address is within the subnet, or transmit the network traffic to a second subnet if the destination IP address is not within the subnet. In doing so, the load balancer 308 can direct the gateway router of the destination by dynamically adjusting routing tables based on real-time analysis of network traffic and IP address availability. The load balancer can tag packets with specific routing instructions or priorities, using protocol extensions or custom fields. This allows the load balancer to direct traffic efficiently, ensuring that packets are sent to an appropriate gateway based on the current network conditions and routing policies.

In some embodiments, the routine 400 can include receiving, from the network device at the destination, an indication that IP addresses within the subnet are capable of receiving the network traffic from the source. The routine 400 can also include receiving a second advertisement from the network device, the second advertisement advertising a different pool of IP addresses as the subnet based on network analysis or user input at the network device at the destination. For example, the load balancer 308 of FIG. 3 can receive this information. These indications from the destination can be provided after a server at the destination configures the destination to receive data according to a certain load balancing algorithm. For example, traffic normally is sent to an ingress point of a data center and load balancing is performed locally within the data center. But here, load balancing can be performed by the load balancer 308 of the source 302 and the destination 304 can then configure itself according to a preferred algorithm. It is the responsibility of the source and associated subnet to confirm that all destination IP addresses are owned or otherwise accessible by the source network device that transmits the protocol advertisement. In doing so, this adds flexibility for the receiving side even though load balancing is performed by the source side. The receiving side can place more IP addresses on one node/subnet if desired, or move those IP addresses to another node/subnet.

The routine 400 therefore avoids the churn of information exchange in the destination data center. There is no need for a handshake every time data traffic goes up or down a layer, but load balancing can still be achieved.

Figure 5:
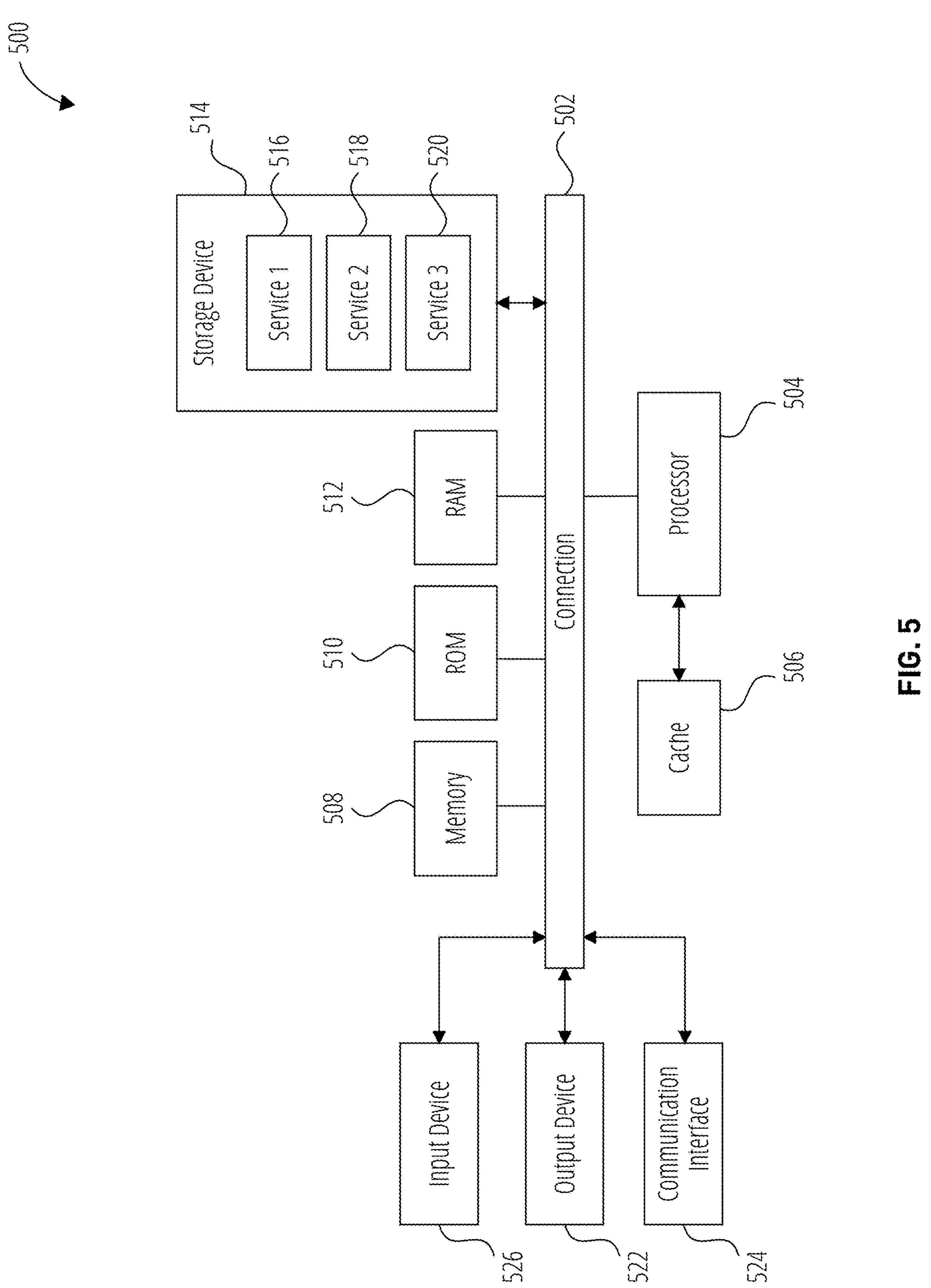
FIG. 5 shows an example of a system for implementing certain aspects of the present technology.

FIG. 5 shows an example of computing system 500, which can be for example any computing device making up a controller, for example a controller of an SDWAN network, or any component thereof in which the components of the system are in communication with each other using connection 502. Connection 502 can be a physical connection via a bus, or a direct connection into processor 504, such as in a chipset architecture. Connection 502 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 500 includes at least one processing unit (CPU or processor) 504 and connection 502 that couples various system components including system memory 508, such as read-only memory (ROM) 510 and random access memory (RAM) 512 to processor 504. Computing system 500 can include a cache of high-speed memory 506 connected directly with, in close proximity to, or integrated as part of processor 504.

Processor 504 can include any general purpose processor and a hard ware service or software service, such as services 516, 518, and 520 stored in storage device 514, configured to control processor 504 as well as a special-purpose processor where software instructions are incorporated into the actual processor design. Processor 504 may essentially be a completely self-contained computing system, containing multiple cores or processors, a bus, memory controller, cache, etc. A multi-core processor may be symmetric or asymmetric.

To enable user interaction, computing system 500 includes an input device 526, which can represent any number of input mechanisms, such as a microphone for speech, a touch-sensitive screen for gesture or graphical input, keyboard, mouse, motion input, speech, etc. Computing system 500 can also include output device 522, which can be one or more of a number of output mechanisms known to those of skill in the art. In some instances, multimodal systems can enable a user to provide multiple types of input/output to communicate with computing system 500. Computing system 500 can include communication interface 524, which can generally govern and manage the user input and system output. There is no restriction on operating on any particular hardware arrangement, and therefore the basic features here may easily be substituted for improved hardware or firmware arrangements as they are developed.

Storage device 514 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 514 can include software services, servers, services, etc., that when the code that defines such software is executed by the processor 504, it causes the system to perform a function. In some embodiments, a hardware service that performs a particular function can include the software component stored in a computer-readable medium in connection with the necessary hardware components, such as processor 504, connection 502, output device 522, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspect 1. A method comprising receiving, at a load balancer at a source, an advertisement from a network device at a destination, the advertisement including a prefix representing an available subnet at the destination; determining, by the load balancer at the source, a distribution of network traffic from the source; and transmitting, by the load balancer at the source, the network traffic to the destination.

Aspect 2. The method of Aspect 1, wherein the advertisement is a border gateway protocol (BGP) advertisement.

Aspect 3. The method of Aspect 1, further comprising receiving, from the network device at the destination, an indication that IP addresses within the available subnet are capable of receiving the network traffic from the source.

Aspect 4. The method of Aspect 1, further comprising receiving a second advertisement from the network device, the second advertisement advertising a different pool of IP addresses as the available subnet based on network analysis or user input at the network device at the destination.

Aspect 5. The method of Aspect 1, further comprising determining, by the load balancer at the source, that the available subnet includes a destination IP address of the network traffic, wherein transmitting the network traffic includes transmitting the network traffic to the available subnet including the destination IP address.

Aspect 6. The method of Aspect 1, wherein transmitting, by the load balancer at the source, the network traffic to the destination includes transmitting, to a gateway router of the available subnet, the network traffic; providing a destination IP address to the gateway router of the available subnet to permit the gateway router to determine whether the destination IP address is included within IP addresses of the available subnet; and providing, within the network traffic, an indication to transmit the network traffic to the destination IP address if the destination IP address is within the available subnet, or transmit the network traffic to a second subnet if the destination IP address is not within the available subnet.

Aspect 7. The method of Aspect 1, wherein the destination is at least one of a data center, a server, a cloud computing environment, a virtual machine, a network storage device, a router, a switch, or a firewall.

Aspect 8. A load balancer comprising a storage configured to store instructions; and at least one processor configured to execute the instructions and cause the at least one processor to receive, at a source, an advertisement from a network device at a destination, the advertisement including a prefix representing an available subnet at the destination; determine, at the source, a distribution of network traffic from the source; and transmit, at the source, the network traffic to the destination.

Aspect 9. The load balancer of Aspect 8, wherein the advertisement is a border gateway protocol (BGP) advertisement.

Aspect 10. The load balancer of Aspect 8, wherein the at least one processor is configured to execute the instructions and further cause the at least one processor to receive, from the network device at the destination, an indication that IP addresses within the available subnet are capable of receiving the network traffic from the source.

Aspect 11. The load balancer of Aspect 8, wherein the at least one processor is configured to execute the instructions and further cause the at least one processor to receive a second advertisement from the network device, the second advertisement advertising a different pool of IP addresses as the available subnet based on network analysis or user input at the network device at the destination.

Aspect 12. The load balancer of Aspect 8, wherein the at least one processor is configured to execute the instructions and further cause the at least one processor to determine, at the source, that the available subnet includes a destination IP address of the network traffic, wherein transmitting the network traffic includes transmitting the network traffic to the available subnet including the destination IP address.

Aspect 13. The load balancer of Aspect 8, wherein the instructions to transmit, by the load balancer at the source, the network traffic to the destination includes transmitting, to a gateway router of the available subnet, the network traffic; providing a destination IP address to the gateway router of the available subnet to permit the gateway router to determine whether the network traffic includes the destination IP address included within IP addresses of the available subnet; and providing, within the network traffic, an indication to transmit the network traffic to the destination IP address if the destination IP address is within the available subnet, or transmit the network traffic to a second subnet if the destination IP address is not within the available subnet.

Aspect 14. The load balancer of Aspect 8, wherein the destination is at least one of a data center, a server, a cloud computing environment, a virtual machine, a network storage device, a router, a switch, or a firewall.

Aspect 15. A non-transitory computer-readable storage medium including instructions that, when executed by at least one processor, cause the at least one processor to receive, at a source, an advertisement from a network device at a destination, the advertisement including a prefix representing an available subnet at the destination; determine, at the source, a distribution of network traffic from the source; and transmit, at the source, the network traffic to the destination.

Aspect 16. The non-transitory computer-readable storage medium of Aspect 15, wherein the advertisement is a border gateway protocol (BGP) advertisement.

Aspect 17. The non-transitory computer-readable storage medium of Aspect 15, wherein the at least one processor is configured to execute the instructions and further cause the at least one processor to receive, from the network device at the destination, an indication that IP addresses within the available subnet are capable of receiving the network traffic from the source.

Aspect 18. The non-transitory computer-readable storage medium of Aspect 15, wherein the at least one processor is configured to execute the instructions and further cause the at least one processor to receive a second advertisement from the network device, the second advertisement advertising a different pool of IP addresses as the available subnet based on network analysis or user input at the network device at the destination.

Aspect 19. The non-transitory computer-readable storage medium of Aspect 15, wherein the at least one processor is configured to execute the instructions and further cause the at least one processor to determine, at the source, that the available subnet includes a destination IP address of the network traffic, wherein transmitting the network traffic includes transmitting the network traffic to the available subnet including the destination IP address.

Aspect 20. The non-transitory computer-readable storage medium of Aspect 15, wherein the instructions to transmit, at the source, the network traffic to the destination includes transmitting, to a gateway router of the available subnet, the network traffic; providing a destination IP address to the gateway router of the available subnet to permit the gateway router to determine whether the destination IP address is included within IP addresses of the available subnet; and providing, within the network traffic, an indication to transmit the network traffic to the destination IP address if the destination IP address is within the available subnet, or transmit the network traffic to a second subnet if the destination IP address is not within the available subnet.

What is claimed is:

1. A method comprising:

receiving, at a load balancer at a source, an advertisement from a network device at a destination, the advertisement including a prefix representing an available subnet at the destination, wherein the available subnet is advertised as a next-hop subnet usable by the load balancer for forwarding network traffic toward a destination IP address at the destination;

determining, by the load balancer at the source, a distribution of network traffic from the source among a plurality of available subnets represented by prefixes received in one or more of the advertisements;

selecting one of the available subnets as the next-hop subnet for a packet of the network traffic independently of whether the destination IP address is included within IP addresses of the selected available subnet; and transmitting, by the load balancer at the source, the network traffic to the destination according to the distribution, including for the packet of the network traffic having the destination IP address, wherein, when the destination IP address is not within the selected available subnet, the packet is forwarded from the selected available subnet to a second subnet at the destination.

2. The method of claim 1, wherein the advertisement is a border gateway protocol (BGP) advertisement.

3. The method of claim 1, further comprising receiving, from the network device at the destination, an indication that IP addresses within the available subnet are capable of receiving the network traffic from the source.

4. The method of claim 1, further comprising receiving a second advertisement from the network device, the second advertisement advertising a different pool of IP addresses as the available subnet based on network analysis or user input at the network device at the destination.

5. The method of claim 1, further comprising:

determining, by the load balancer at the source, that the selected available subnet includes a destination IP address of the network traffic, wherein transmitting the network traffic includes transmitting the network traffic to the selected available subnet including the destination IP address.

6. The method of claim 1, wherein transmitting, by the load balancer at the source, the network traffic to the destination includes:

transmitting, to a gateway router of the selected available subnet, the network traffic;

providing a destination IP address to the gateway router of the selected available subnet to permit the gateway router to determine whether the destination IP address is included within IP addresses of the selected available subnet; and providing, within the network traffic, an indication to transmit the network traffic to the destination IP address if the destination IP address is within the selected available subnet, or transmit the network traffic to a second subnet if the destination IP address is not within the selected available subnet.

7. The method of claim 1, wherein the destination is at least one of a data center, a server, a cloud computing environment, a virtual machine, a network storage device, a router, a switch, or a firewall.

8. A load balancer comprising:

a storage configured to store instructions; and at least one processor configured to execute the instructions and cause the at least one processor to:

receive, at a source, an advertisement from a network device at a destination, the advertisement including a prefix representing an available subnet at the destination, wherein the available subnet is advertised as a next-hop subnet usable by the load balancer for forwarding network traffic toward a destination IP address at the destination;

determine, at the source, a distribution of network traffic from the source among a plurality of available subnets represented by prefixes received in one or more of the advertisements;

select one of the available subnets as the next-hop subnet for a packet of the network traffic independently of whether the destination IP address is included within IP addresses of the selected available subnet; and transmit, at the source, the network traffic to the destination according to the distribution, including for the packet of the network traffic having the destination IP address, wherein, when the destination IP address is not within the selected available subnet, the packet is forwarded from the selected available subnet to a second subnet at the destination.

9. The load balancer of claim 8, wherein the advertisement is a BGP advertisement.

10. The load balancer of claim 8, wherein the at least one processor is configured to execute the instructions and further cause the at least one processor to receive, from the network device at the destination, an indication that IP addresses within the available subnet are capable of receiving the network traffic from the source.

11. The load balancer of claim 8, wherein the at least one processor is configured to execute the instructions and further cause the at least one processor to receive a second advertisement from the network device, the second advertisement advertising a different pool of IP addresses as the available subnet based on network analysis or user input at the network device at the destination.

12. The load balancer of claim 8, wherein the at least one processor is configured to execute the instructions and further cause the at least one processor to:

determine, at the source, that the selected available subnet includes a destination IP address of the network traffic, wherein transmitting the network traffic includes transmitting the network traffic to the selected available subnet including the destination IP address.

13. The load balancer of claim 8, wherein the instructions to transmit, by the load balancer at the source, the network traffic to the destination includes:

transmitting, to a gateway router of the selected available subnet, the network traffic;

providing a destination IP address to the gateway router of the selected available subnet to permit the gateway router to determine whether the network traffic includes the destination IP address included within IP addresses of the selected available subnet; and providing, within the network traffic, an indication to transmit the network traffic to the destination IP address if the destination IP address is within the selected available subnet, or transmit the network traffic to a second subnet if the destination IP address is not within the selected available subnet.

14. The load balancer of claim 8, wherein the destination is at least one of a data center, a server, a cloud computing environment, a virtual machine, a network storage device, a router, a switch, or a firewall.

15. A non-transitory computer-readable storage medium including instructions that, when executed by at least one processor, cause the at least one processor to:

receive, at a source, an advertisement from a network device at a destination, the advertisement including a prefix representing an available subnet at the destination, wherein the available subnet is advertised as a next-hop subnet usable by the load balancer for forwarding network traffic toward a destination IP address at the destination;

determine, at the source, a distribution of network traffic from the source among a plurality of available subnets represented by prefixes received in one or more of the advertisements;

select one of the available subnets as the next-hop subnet for a packet of the network traffic independently of whether the destination IP address is included within IP addresses of the selected available subnet; and transmit, at the source, the network traffic to the destination according to the distribution, including for the packet of the network traffic having the destination IP address, wherein, when the destination IP address is not within the selected available subnet, the packet is forwarded from the selected available subnet to a second subnet at the destination.

16. The non-transitory computer-readable storage medium of claim 15, wherein the advertisement is a BGP advertisement.

17. The non-transitory computer-readable storage medium of claim 15, wherein the at least one processor is configured to execute the instructions and further cause the at least one processor to receive, from the network device at the destination, an indication that IP addresses within the available subnet are capable of receiving the network traffic from the source.

18. The non-transitory computer-readable storage medium of claim 15, wherein the at least one processor is configured to execute the instructions and further cause the at least one processor to receive a second advertisement from the network device, the second advertisement advertising a different pool of IP addresses as the available subnet based on network analysis or user input at the network device at the destination.

19. The non-transitory computer-readable storage medium of claim 15, wherein the at least one processor is configured to execute the instructions and further cause the at least one processor to:

determine, at the source, that the selected available subnet includes a destination IP address of the network traffic, wherein transmitting the network traffic includes transmitting the network traffic to the selected available subnet including the destination IP address.

20. The non-transitory computer-readable storage medium of claim 15, wherein the instructions to transmit, at the source, the network traffic to the destination includes:

transmitting, to a gateway router of the selected available subnet, the network traffic;

providing a destination IP address to the gateway router of the selected available subnet to permit the gateway router to determine whether the destination IP address is included within IP addresses of the selected available subnet; and providing, within the network traffic, an indication to transmit the network traffic to the destination IP address if the destination IP address is within the selected available subnet, or transmit the network traffic to a second subnet if the destination IP address is not within the selected available subnet.

* * * * *